United States Patent
Haillot

(10) Patent No.: US 9,555,752 B2
(45) Date of Patent: Jan. 31, 2017

(54) METHOD FOR RATIONALISING A CHAIN OF ELECTRICAL COMPONENTS OF AN AIRCRAFT, IMPLEMENTATION ARCHITECTURE AND CORRESPONDING AIRCRAFT

(75) Inventor: Jean-Michel Haillot, Beuste (FR)

(73) Assignee: TURBOMECA, Bordes (FR)

( * ) Notice: Subject to any disclaimer, the term of this patent is extended or adjusted under 35 U.S.C. 154(b) by 484 days.

(21) Appl. No.: 14/118,076

(22) PCT Filed: May 15, 2012

(86) PCT No.: PCT/FR2012/051085
§ 371 (c)(1),
(2), (4) Date: Nov. 15, 2013

(87) PCT Pub. No.: WO2012/160294
PCT Pub. Date: Nov. 29, 2012

(65) Prior Publication Data
US 2014/0084677 A1  Mar. 27, 2014

(30) Foreign Application Priority Data
May 20, 2011  (FR) ...................... 11 54431

(51) Int. Cl.
B60L 1/00      (2006.01)
B60R 16/03     (2006.01)
F02C 7/32      (2006.01)
F02C 7/36      (2006.01)

(52) U.S. Cl.
CPC ............. B60R 16/03 (2013.01); F02C 7/32 (2013.01); F02C 7/36 (2013.01); *F05D 2220/50* (2013.01); *Y02T 50/671* (2013.01)

(58) Field of Classification Search
CPC ............. B60R 16/03; F02C 7/32; F02C 7/36; F05D 2220/50; Y02T 50/671
USPC ........................................... 307/9.1
See application file for complete search history.

(56) References Cited

U.S. PATENT DOCUMENTS

| 4,456,830 A | 6/1984 | Cronin |
| 5,201,798 A | 4/1993 | Hogan |
| 2006/0179846 A1 | 8/2006 | Manrique et al. |
| 2009/0302152 A1 | 12/2009 | Knight |
| 2010/0167863 A1 | 7/2010 | Lemmers |

FOREIGN PATENT DOCUMENTS

| EP | 2 025 899 | 2/2009 |
| EP | 2 202 395 | 6/2010 |
| GB | 2 429 500 | 2/2007 |

*Primary Examiner* — Hal Kaplan
(74) *Attorney, Agent, or Firm* — Oblon, McClelland, Maier & Neustadt, L.L.P.

(57) ABSTRACT

A chain of components for transmitting electric power of an aircraft includes an auxiliary power unit (APU), main engines and end consumer systems via power networks and electronic connections controlled by a unit. The APU supplies power to a shaft by a connection to at least one energy converter unit, via a transmission unit, each converter unit comprising only one convertible electromechanical component. The transmission of power is effected by a direct connection to the transmission unit and to the end consumer system. The connection between a converter unit and the APU is provided by connecting the shaft of the APU to the shaft of the starter/generator (SG) via a directional transmission of power operating in one direction only from the shaft of the APU to the shaft of the SG.

15 Claims, 7 Drawing Sheets

METHOD FOR RATIONALISING A CHAIN OF ELECTRICAL COMPONENTS OF AN AIRCRAFT, IMPLEMENTATION ARCHITECTURE AND CORRESPONDING AIRCRAFT

TECHNICAL FIELD

The invention relates to a method for rationalising a chain of components for transmission of electrical energy of an aircraft. The invention also relates to an electromechanical architecture capable of implementing such a method and an aircraft with electrical energy components arranged in accordance with this architecture.

Aircraft generally have at least one on-board auxiliary power unit known as the APU. An APU is a small turbojet which, associated with an electric current generator, is able to provide electrical energy to an electric motor dedicated to moving the aircraft on the ground.

APUs are thus conventionally fitted in aircraft to provide power on the ground to the different energy-consuming systems (electrical, pneumatic and hydraulic power, air-conditioning), and to start the main engines. An APU can if necessary be restarted and used in flight in the event of a failure of the air-conditioning control system or the electrical distribution system. Sufficiently safe to be given certification, for example engine type certification, it can then, in some flight phases, take the place of the main engines in providing energy to the energy-consuming systems.

As shown in the diagram in FIG. 1, an APU 10 conventionally consists of a gas generator—comprising a compressor 1 of air A1, a chamber 2 for the combustion of the mixture of air A1 and fuel K1, and two turbines 3 and 4—and of at least one drive and power shaft 5. The second turbine 4 is conventionally a fixed type turbine, the most powerful APUs being equipped with a free turbine.

Stages 3 and 4 of expansion of the gases G1 provide power to the compressor 1 via the drive shaft 5. This shaft 5 is also a power shaft: residual power therefore remains available on the shaft 5 to drive the systems when the APU is operational, for example on the ground or during some flight phases, in particular on take-off, on landing, or in the event of a potential engine failure. Where the turbine 4 is a free turbine, the available power is transmitted to the systems on a drive shaft collinear with the shaft 5.

To meet the requirement for compressed air Ac, for example while taxiing, a load compressor 6 is driven by the available power provided by the shaft 5 to compress the incoming air A0. This compressor 6 is connected, for example, to an air-conditioning system or to a pneumatic pressure system (not shown).

In order to provide electrical power to the systems, in particular for starting the main engines, the shaft 5 is connected to two alternators 7a and 7b fitted in parallel via pinions P1 to P3 of a power transmission gearbox 8. On each drive shaft 9a and 9b of each alternator 7a and 7b, there is disposed a mechanical fuse Fa, Fb respectively, enabling excessive levels of torque to be cut back in the event of an alternator failure. These fuses can, for example, be toothed positive clutches or breakable sections.

The electric current generation means, consisting of at least one alternator, is duplicated here because safety technology provides for functional redundancy and having at least two independent electrical circuits available. In general, items of equipment are conventionally duplicated and remain independent.

An APU is conventionally started by an electric starter assembly (not shown) and the main engines are started by a pneumatic starter powered by the load compressor 6 fitted to the drive shaft 5 of the APU.

PRIOR ART

The recent advent of the electric starter/generator (abbreviated to SG) has enabled the use of a pneumatic starter 6 for the main engines and an electric starter assembly for the APU to be eliminated. By using power electronics EP1 and EP2, the alternators 7a and 7b operating as SGs are converted, by power connections LP1 and LP2, into a motor (starter) during the APU start phase and then converted into a generator in the electrical current supply phase (alternator). The power electronics regulate the electrical power supplied by the SGs 7a and 7b from the aircraft electrical networks R1 and R2 or transmitted to these networks. This transmission makes it possible to provide power to the aircraft systems, in particular to the motor-compressor sets of the air-conditioning systems.

During starting of the APU, initiated from the aircraft batteries, the direct current is converted by the EP1 and EP2 electronics into current alternating at a variable frequency allowing control of the speed and/or the torque to be adjusted during the APU starting phase.

In addition, a digital control unit U1, also called FADEC (Full Authority Digital Engine Control) regulates the speeds of the gears of the power transmission unit 8. The regulation is effected by injecting the appropriate quantity of fuel K1 into the combustion chamber 2 via a metering unit D1. This quantity is calculated and applied by the control unit U1 in accordance with the difference between the speed of the gears of the transmission unit 8 provided by a speed sensor Cv, and transmitted to the control unit U1, and a reference value. The control unit U1 and the power electronics EP1, EP2 are in cabled or radio connections LA with the aircraft control centre, in order to coordinate and anticipate the power control with the flight conditions.

Nowadays, a major increase in electrical systems tends to favour the "all-electric" concept. The use of an energy supply architecture on the basis described above is unsuitable for driving these systems.

It is known, for example, to dedicate a power electronics system to controlling the motors of the load compressors, or motor-compressor sets, to meet the requirements for compressed air. In general, four motor-compressor sets are used in the networks R1, R2 to supply power to two air-conditioning systems or ECSs (Environment Control System). This type of control requires the use of motor-compressor sets and a large-capacity alternator, for example with power of 200 kVA, to generate the electricity requirements of the motor of each motor-compressor set and the electricity requirements of the aircraft, in particular during starting of the APU.

Thus, the multiplication of the systems leads to the use of excessive numbers of motors and/or generators for electrical coordination of the systems, and also a multiplication of the electromechanical connection systems in the gearboxes. The architecture thus becomes complex and not very economical in its energy use. In particular, the space occupied, mass and cost are increased, while reliability is reduced.

In addition, in an aircraft alternating current supply network, the APU adds a major source of power whose use, restricted some phases of flight, takes the form of very complex circuit switching in real time in the electrical master box, in particular to ensure that the different functions are provided in the event of a failure.

The energy recovered by recycling, for example during deceleration on the ground by the landing gear motors (a function known as "green taxiing") or by heat exchangers disposed in appropriate positions, cannot be used by APUs in flight phases in which they are not operational, as the starting time and the time for loading authorisation are too long: an additional energy absorption system has to be installed.

The technological redundancy of an APU can be ensured by the main engines. However, this solution requires these engines to be connected to the pneumatic system. Alternatively, independent systems, such as motor-compressor sets, can be considered to provide the redundancy. However, these solutions add extra systems, which contribute to the overall increase in complexity.

DESCRIPTION OF THE INVENTION

The aim of the invention is to overcome these drawbacks and, in particular, to produce an architecture that is able to rationalise the electrical distribution between different components of an aircraft, in order to reduce the number of components, the space occupied, mass and cost, while ensuring a high degree of reliability.

In order to do this, the invention proposes to optimise the power supply via a method of operation of the APUs' electrical supply systems that is adapted to be reversible. This method of operation allows an adaptation, in the event of a failure of the APU or of the system for supplying pneumatic or hydraulic power.

More specifically, the present invention relates to a method for rationalising a chain of components for transmission of electrical power of an aircraft that has an auxiliary power unit (APU), main engines and systems that are end consumers of electrical, pneumatic and/or hydraulic power managed by dedicated control systems. The APU provides power delivered to a drive shaft by connection to at least one energy converter unit via a power transmission unit. Each converter unit has only one convertible electromechanical starter/generator component and an associated energy converter. Power is transmitted from the or each converter unit by direct connection, firstly, to the transmission unit and, secondly, to the dedicated end system.

This method thus makes it possible to eliminate the intermediate electromechanical conversion equipment (motors, generators, converters, etc.) and to reduce the power capacities required to supply energy to dedicated end systems, such as air-conditioning systems.

This method also allows a rationalisation of the absorption of energy recovered by the other systems of the aircraft, such as the motors for the landing gear wheels during braking or a turbine for recovering energy in conjunction with a heat exchanger.

Advantageously, the connection between the converter unit and the APU is made in the transmission unit by connecting the drive shaft of the APU to the shaft of the starter/generator SG via a directional transmission of power operating in one direction only from the drive shaft of the APU to the shaft of the SG, the transmission being free or without communication of drive in the other direction.

According to particular embodiments, the method may provide that:
the or one of the SGs is configured to operate in motor mode during the APU starting phase, and then to drive the APU via a directional transmission of power running from the [converter] unit to the APU;
the SG then operating in motor mode is advantageously moveably connected to the drive shaft of the APU in such a way that the associated energy converter is not driven during the APU starting phase;
a turbine for the recovery of energy, by heat exchange at the outlet of hot gases emerging from pneumatic equipment and/or the main engines, drives at least partially a converter unit by connection in the power transmission unit via at least one directional transmission of power running from the recovery turbine to the converter unit;
the or one of the converter units is dedicated to taxiing by the supply of electrical power in combination with a landing gear motor of the aircraft and the other [converter] unit [is dedicated] to supplying energy in accordance with the requirements of the aircraft, the unit dedicated to taxiing being configured to operate in generator mode in conjunction with the drive shaft of the APU in accordance with the traction requirement of said motor unit, and in motor mode to drive the associated compressor when the landing gear motor unit is converted to generator mode during the braking phases;
alternatively, an additional SG is dedicated to taxiing and connected to the APU shaft in the transmission unit in order to be driven by this shaft and to operate in generator mode in accordance with the traction requirement of the landing gear motor unit, and to operate in motor mode to drive the shaft of the APU which is itself in motor mode when the landing gear motor unit is converted to generator mode during the braking phases.

The invention also relates to an electromechanical architecture having components for transmission of electrical power in an aircraft, capable of implementing the above method. An architecture of this kind has an APU, a control unit connected to at least one power electronics [system], a unit for transmission of power by geared means between, firstly, the shafts of at least one converter unit, incorporating for each unit a single SG convertible by the control unit and, secondly, a drive shaft of the APU transmitting power, and also direct electrical power connections to an end consumer system. Each converter unit is directly connected to the power transmission unit and to the dedicated end system.

According to whether the dedicated end system is an air-conditioning system, a hydraulic circuit or an electrical network, the converter unit has a compressor, a hydraulic pump or an alternator respectively as the associated energy converter.

Advantageously, the transmission of power is performed in the transmission unit by connecting the drive shaft of the APU to the rotating shafts of the starter/generators SG via directional means for the communication of power fitted to the drive shaft of the APU and to the rotating shafts of the SGs.

According to some preferred embodiments:
the directional means for the communication of power are chosen from a free wheel, a release sleeve and a centrifugal or electromechanical clutch;
the control unit is able, during the APU starting phase, to configure the SG of a converter unit in motor mode and to drive the shaft of the APU by connecting to that APU shaft via at least one directional means for the communication of power;
advantageously, during the APU starting phase, the driving of the shaft of the APU is effected by a connection means movable between the SG and the APU shaft via at least one directional transmission means, this connection means simultaneously effecting a disconnection between the SG and the associated energy converter;

a turbine for energy recovery, based on heat exchangers at the outlet of the pneumatic equipment and/or the main engines, is connected to at least one converter unit in the transmission unit in order to drive it, in addition to the driving effected by the APU shaft, via at least one directional means for the communication of power running from the recovery turbine to the converter unit;

one of the converter units, dedicated to taxiing by a connection means to at least one drive shaft of the aircraft landing gear motors, another unit being dedicated to supplying energy in accordance with the aircraft requirements, is configured by the control unit in generator mode to complement the driving effected by the shaft of the APU in accordance with the traction requirement of said landing gear motors, and in drive motor mode for the energy converter of this converter unit when the landing gear motors are converted to generator mode by the control unit during braking phases;

an additional SG, dedicated to taxiing, is driven by the shaft of the APU by connection in the transmission unit and is converted by the control unit to generator mode to meet the traction requirement of the landing gear motors, and to motor mode to drive the shaft of the APU when the control unit converts the landing gear motors into generator mode during braking phases;

mechanical fuses are fitted to the drive shafts of the compressors and of the SGs of each motor-compressor set.

PRESENTATION OF THE DRAWINGS

Other data, features and advantages of the present invention will become apparent on reading the non-limited description that follows, with reference to the appended drawings in which.

DETAILED DESCRIPTION

Figure 1:
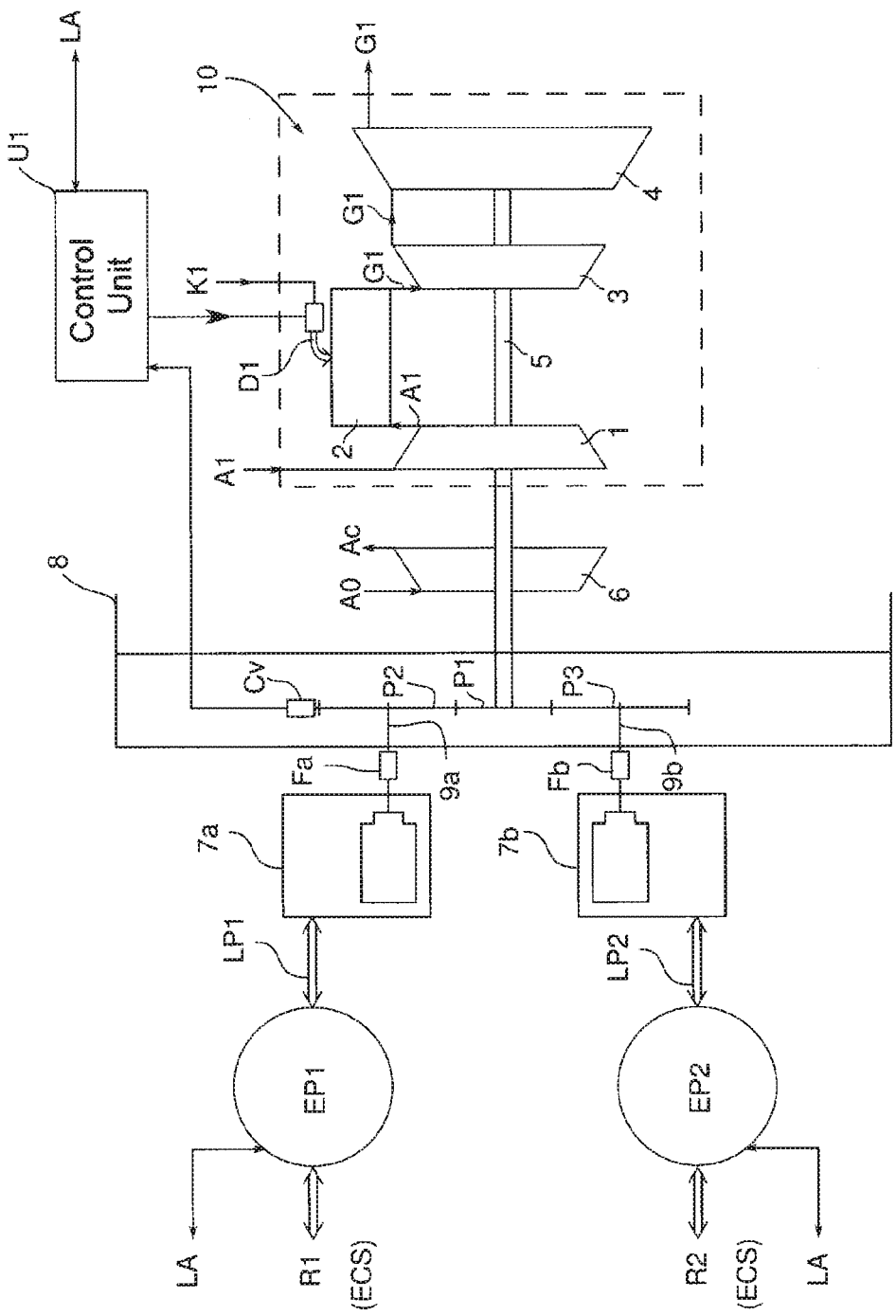
FIG. 1 is a basic diagram of an energy distribution architecture with two motor-compressor sets connected to an APU (already explained)
Figure 2:
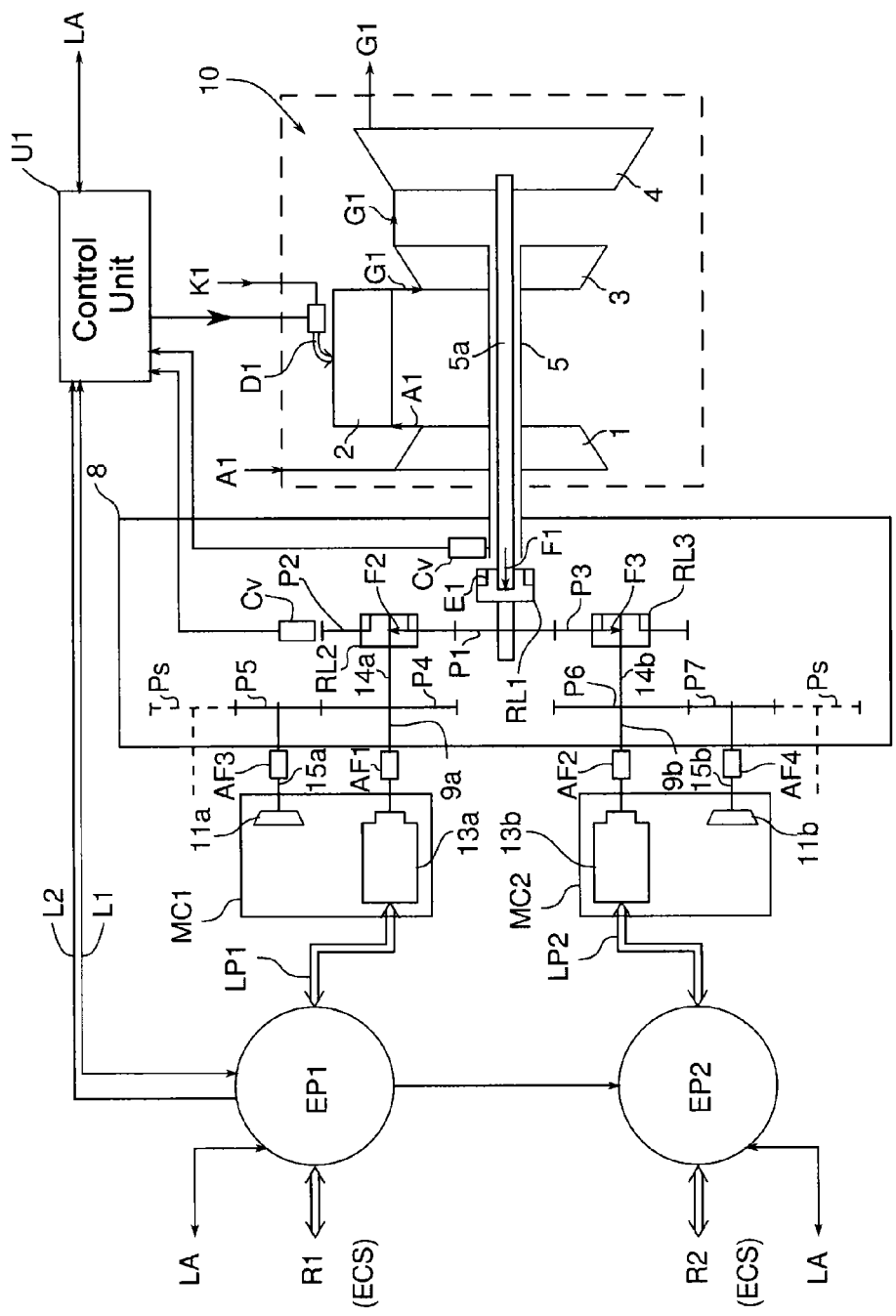
FIG. 2 is a diagram of a specimen architecture according to the invention with directional power communication means to the main shafts.

With reference to the diagram shown in FIG. 2, the architecture 10 illustrated has an APU of the type shown in FIG. 1 with, in this example, a power turbine 4 of a free turbine type for driving the power shaft 5a. The elements identical to those in FIG. 1 (networks R1, R2, power electronics EP1, EP2, power connections LP1, LP2, control unit U1, speed sensor Cv, aircraft connections LA) are designated by the same references in FIGS. 2 to 7 (unless expressly indicated otherwise).

The sharing of the functions of the architecture connected to the APU 10 according to the invention is rationalised via bidirectional connections L1 and L2 between the control unit U1 and each of the power electronics EP1, EP2 that manages the starter/generator or SG conversion of the alternators 13a, 13b, during the different phases: starting of the APU or main engines, absorption of energy or taxiing. Thus, the power electronics EP1, EP2 transmit information to the unit U1 concerning the level of power that the alternators must supply in order to anticipate the power supply transients of the APU or to achieve speed optimisation. In the other direction, the power electronics EP1, EP2 receive from the unit U1 the signal confirming the power that can be supplied by the APU.

The gas generator consists of the compressor 1, the combustion chamber 2 and an HP (high pressure) turbine 3. This turbine provides the power to drive the compressor 1 via the drive shaft 5. The speed of the drive shaft 5 is measured by a sensor Cv and the information is transmitted to the control unit U1.

The gas generator also comprises a free power turbine 4. The residual energy leaving the turbine 3 is then transferred to the power turbine 4, a free turbine in the example, which provides mechanical power to the power shaft 5a. This power is available to drive, via the transmission unit 8, systems capable of converting this power into pneumatic, electric or hydraulic power.

In the example, the APU 10 thus provides pneumatic power by driving load compressors 11a and 11b and electric power by driving alternators 13a and 13b. Other items of equipment shown in dotted lines can be driven, in particular a hydraulic pump and/or an alternator and/or a starter/generator SG dedicated to taxiing (see below with reference to FIG. 5).

All these systems are driven by the power shaft 5a via pinions P1 to P7 assembled in the transmission unit 8. Additional pinions Ps, shown in dotted lines, can drive the other items of equipment mentioned above.

More specifically, the shaft 5a transmits the power to the pinion P1 by means of a free wheel RL1. The arrow F1 indicates the direction of active communication of the power transmitted by the free wheel RL1. The transmission of power thus runs from the shaft 5a towards the pinion P1, and cannot be transmitted in the opposite direction, in other words, from the pinion P1 to the shaft 5a. Indeed, as the engagement E1 of the free wheel RL1 is, by design, active only in one direction of rotation corresponding to the direction of transmission indicated by the arrow F1, there is no engagement in the opposite direction and therefore transmission from the pinion P1 to the shaft 5a is impossible.

The pinions P2 and P3, engaged by the pinion P1, drive in parallel the free wheels RL2 and RL3 respectively. On these free wheels, the shafts 14a and 14b of the drive pinions P4 and P6 of the alternators 13a and 13b are fitted via frangible shafts AF1 and AF2. The arrows F2 and F3 indicate the direction of active communication of power imposed by the free wheels RL2 and RL3, in other words, from the pinion P2 to the pinion P4 and from the pinion P3 to the pinion P6 respectively.

In addition, the compressors 11a and 11b, which enable pneumatic energy to be produced, are driven respectively by shafts 15a and 15b of pinions P5 and P7, via frangible shafts AF3 and AF4, the pinions P5 and P7 being engaged by the pinions P4 and P6 of the alternators 13a and 13b respectively. Each alternator 13a, 13b drives a compressor 11a, 11b respectively: each pair consisting of an alternator 13a, 13b and the corresponding compressor 11a, 11b forms a motor-compressor set MC1, MC2.

In this architecture, the free wheel RL1 duplicates the disconnection function performed by the free wheels RL2 and RL3. It can be eliminated if necessary, in particular where there is additional duplication of the alternators and/or the compressors. As a variant of the free wheel RL1, a release sleeve can be introduced on the shaft 5a. A sleeve of this kind is described in patent document FR 2 887 945 incorporated by reference.

Figure 3:
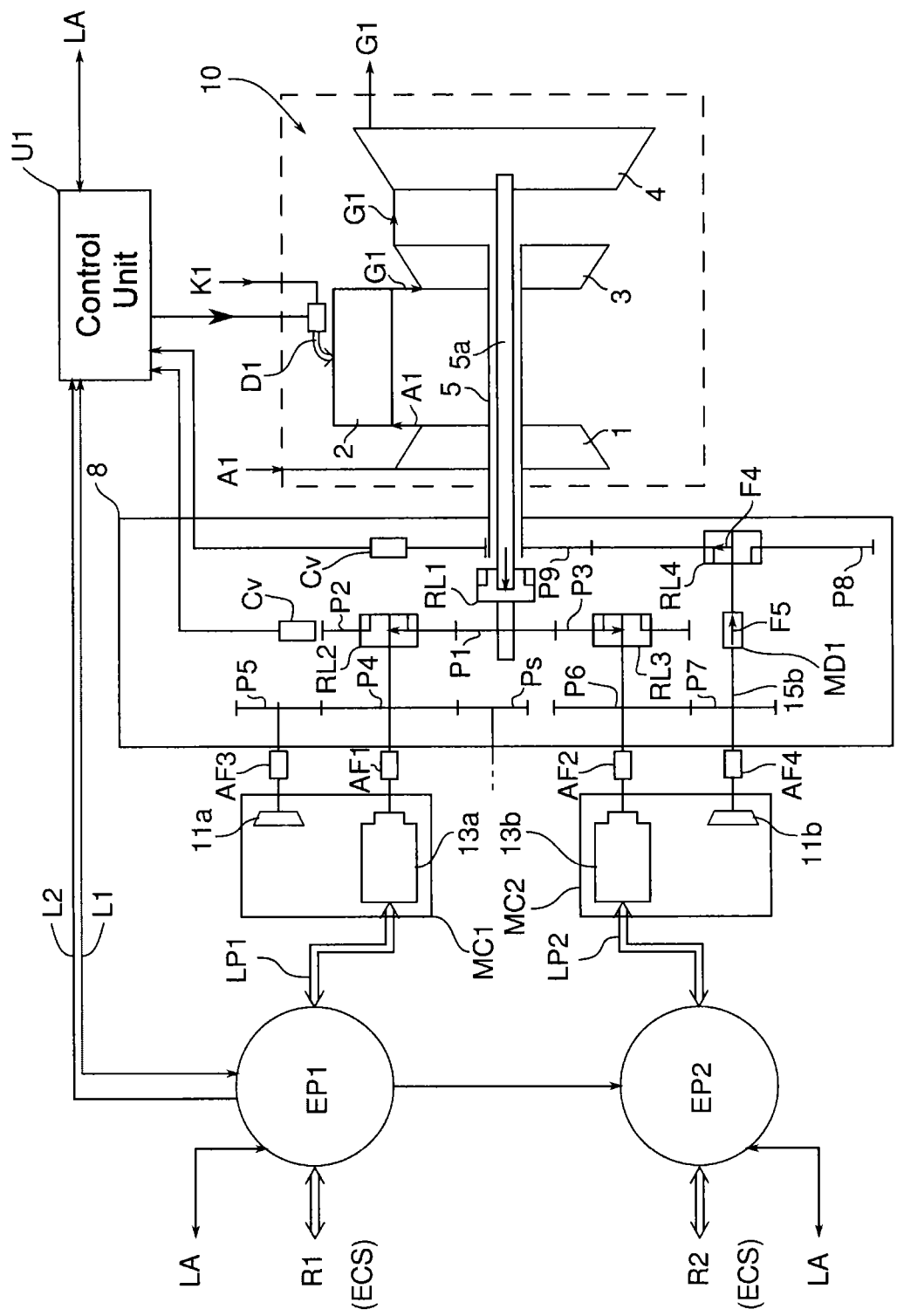
FIG. 3 is a diagram of architecture according to FIG. 2 applied to the starting of the APU and to taxiing.

The architecture according to the invention enables the systems and the starting functions of the APU to be shared, and also the energy recovery or absorption functions. FIG. 3 therefore repeats and adds to the architecture of FIG. 2 in order to illustrate the implementation of a solution for starting the APU via one or other of the alternators, for example the alternator 13b.

The alternator 13b converted into a starter, by this function being called upon by the associated power electronics EP2, drives the shaft 5 via the series of pinions P6, P7, P8 and P9: the pinion P6 fitted to the shaft 15b of the alternator 13b engages with the pinion P7 which drives the compressor 11b and a free wheel RL4. The arrow F4 indicates the direction of the free wheel RL4, in other words, a communication of power is transmitted to the pinion P8. Said pinion engages with the pinion P9 centred on the shaft 5 of the APU 10.

Advantageously, the power between the pinions P7 and P8 is transmitted via a release sleeve MD1. This fuse can be that of the technology used to drive air starters on an engine. These starters are capable of transmitting high levels of torque via a fuse calibrated accordingly in the direction of the arrow F5 (from the pinion P7 towards the pinion P8) but, conversely, the fuse acts as a weak link if power is transmitted in the opposite direction. This system prevents the gas generator from being driven in the event of the free wheel RL4 failing.

As far as redundancy is concerned, it is possible to directly transpose the same principle, in an alternate or cumulative manner, to the other alternator 13a converted to a starter.

Figure 4:
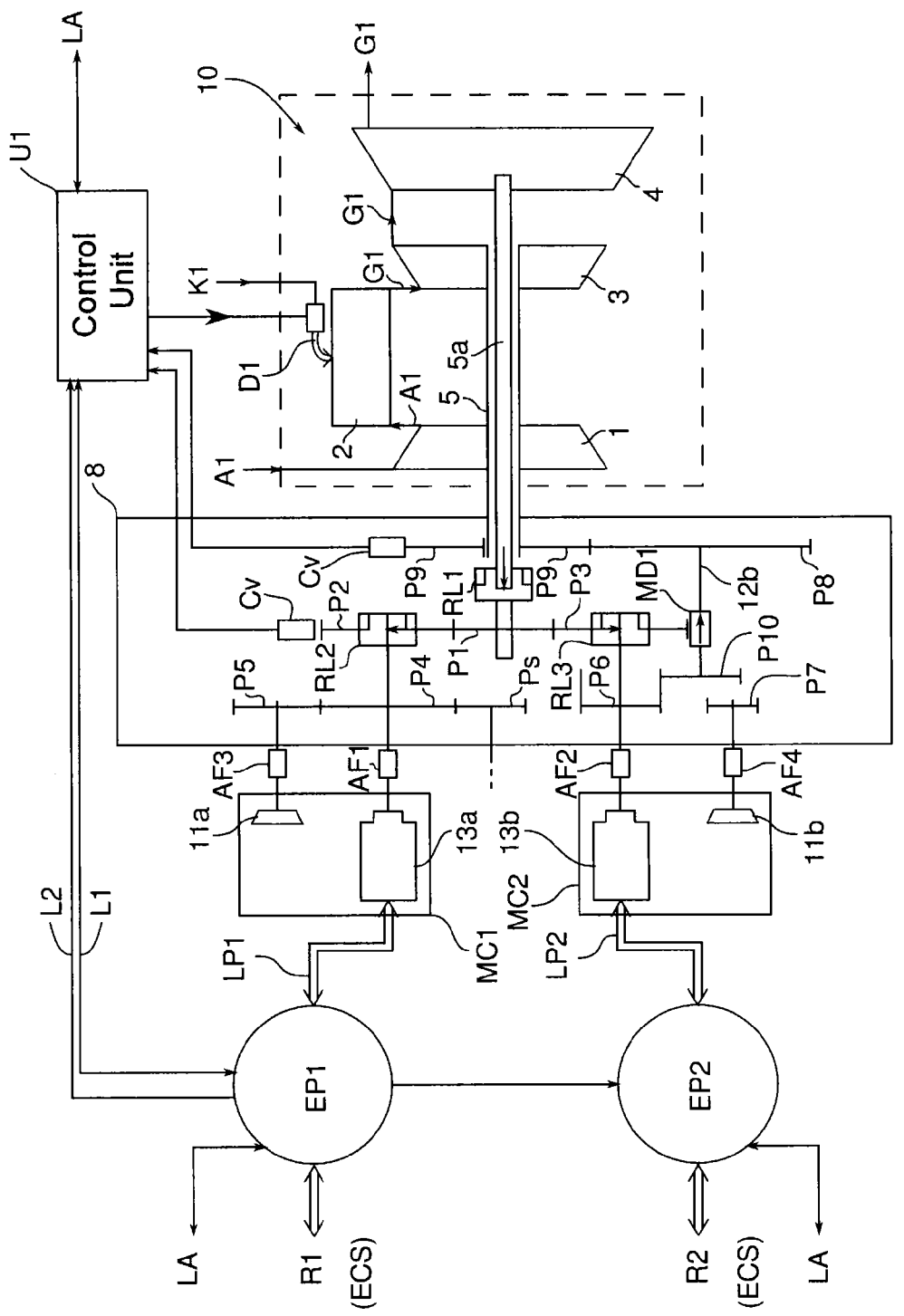
FIGS. 4 and 5 are diagrams of a variant of FIG. 3 for performing, in two phases, the starting function of the architecture without the use of a compressor.

Alternatively, FIG. 4 illustrates a variant to perform the starting function without driving the compressor 11b during the starting phase of the APU, and thus reduce the power to be provided during this phase. In this variant, a moveable pinion P10 of the shaft 12b bearing the release sleeve MD1 is introduced between the pinions P6 and P7. The pinion P6 drives via wide toothing the pinion P10, which does not engage with the pinion P7 whose toothing is substantially less wide than that of the pinion P6. Through the release sleeve MD1, power is transmitted to the pinion P8 which drives the pinion P9. The pinion P8 is also moveable along its shaft which is combined with the shaft 12b of the pinion P10, so that the set of two pinions P8-P10 constitutes a directional gear set moveable in translation.

Figure 5:
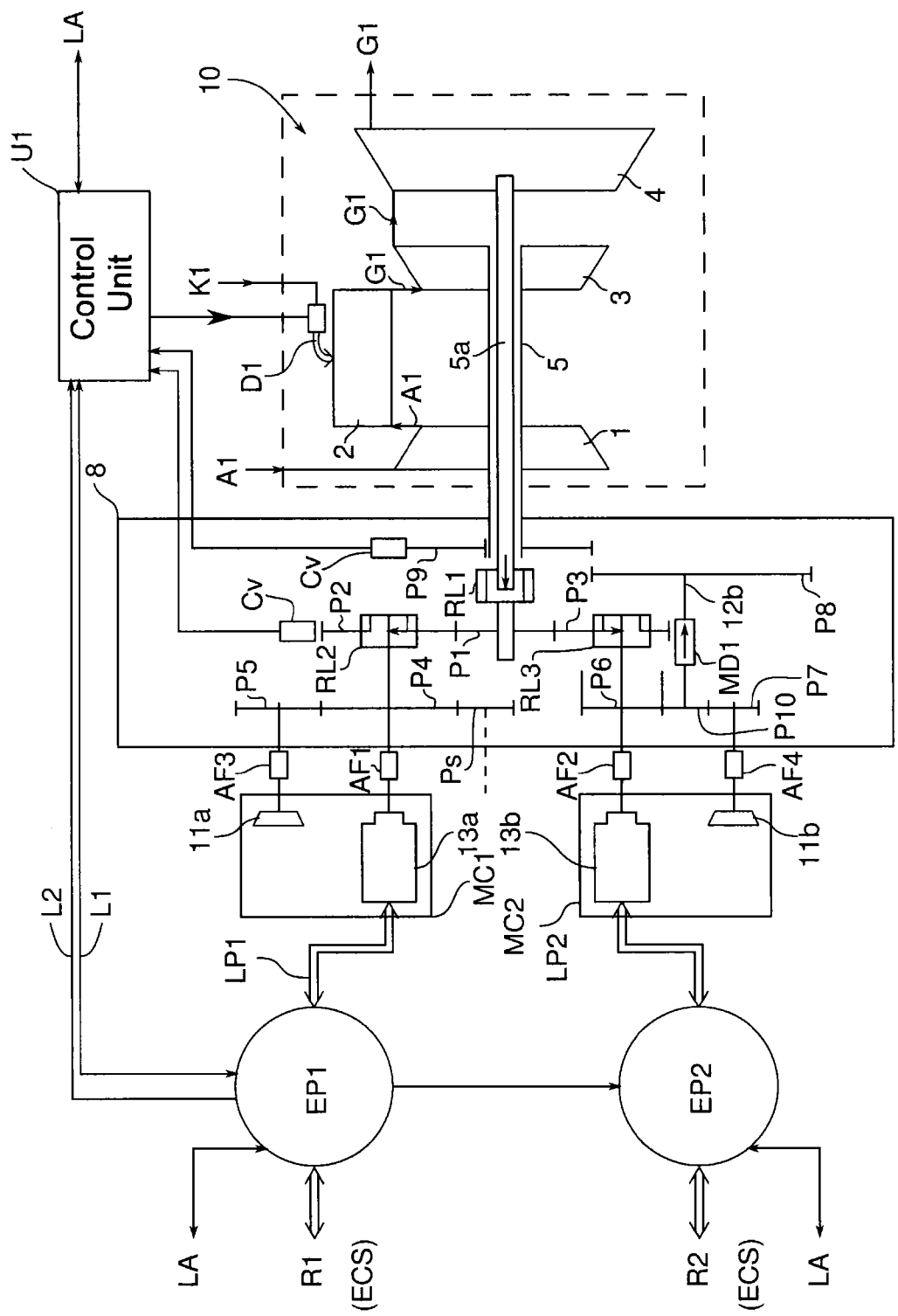

FIG. 5 shows a diagram of this same solution after the starting phase, in other words in the configuration for supply of power by the APU 10. In this configuration, the pinion set P10 and P8 connected by the release sleeve MD1 is translated in such a way that it is no longer engaged with the pinion P9 of the APU shaft 5. In these conditions, the APU transmits power via its shaft 5a in the basic configuration shown in FIG. 2.

This solution may advantageously include angle measurement synchros (not shown) for restarting the APU in residual rotation, for example because of autorotation via a "windmill effect" or at the end of the starting sequence when the free turbine 4 is accelerated at low speed.

Furthermore, the functional sharing of the items of equipment according to the invention—in particular via the shared management of the alternators 13a and/or 13b and of the compressors 11a and/or 11b by the power electronics EP1/EP2 in a bidirectional connection L1/L2 with the FADEC U1—allows a rationalised implementation of [energy] recovery by absorption of power. This recovery comes, for example, from the braking phases of the landing wheels, during taxiing and/or landing phases or, as another example, from an associated recovery turbine.

For example, during the taxiing and/or landing phase, the alternators 13a and 13b of FIGS. 2 to 5 are advantageously converted into motors—starter function by means of the power electronics EP1 and EP2—in order to absorb the power provided by the motors of the main [landing] gear that are converted into generators.

In particular, with reference to FIG. 3, the alternator 13a which is not dedicated to starting the APU (nor to supplying power after starting) can be dedicated to this power absorption function.

Thus, during the taxiing phase, all the aircraft electrical power requirements are met by the other convertible alternator 13b, in other words, operating in SG, starter or generator modes. The power electronics concerned EP2 then manages the requirements via the two aircraft networks R1 and R2 connected during this phase.

In the normal traction requirement mode of the landing gear motors, the energy needed to move the aircraft is provided by the generator 13a. In braking mode, the electric motors of the landing gear are converted into alternators and provide electrical power, transmitted by means of additional pinions Ps, to the alternator 13a as motor (starter function). This power is transmitted by means of the pinions P4 and P5 to the compressor 11a in order to recover the energy in pneumatic form. The additional energy that may be needed to drive the compressor 11a is provided by the power turbine 4 of the APU 10.

The sharing of the power electronics EP1 and EP2 dedicated to each of the alternators 13a and 13b that can be converted into SGs also makes it possible to manage APU failures by using these alternators as motors (starter function).

Thus, in the event of a failure of the APU 10, the shaft 5a is no longer driven and therefore no longer drives the pinion P1. The alternator 13a converted into a motor provides the mechanical power needed to drive the load compressor 11a and other items of equipment as necessary. Similarly, the alternator 13b can be converted into a motor to provide the mechanical power needed to drive the load compressor 11b and other items of equipment.

In these conditions, the two alternator and compressor sets, 13a/11a and 13b/11b, which form two separate sets equivalent to two motor-compressor sets, MC1 and MC2, may be used in the event of a failure of the APU. This avoids the addition of two other emergency systems. The reliability of the system of connection by pinion is sufficient to meet the safety requirements.

By extension and in the same way, if the APU fails in flight—or in order to ensure continuity of supply of compressed air during the APU starting phase—it is advantageous to use the motor-compressor systems MC1 or MC2 without starting the APU 10. With reference to FIG. 3, the motor-compressor system MC1 is operative, and the second motor-compressor MC2 initiates the APU for starting.

It is thus possible to absorb electrical power during some phases of flight. Even if the APU 10 is operational, power additional to that provided by the power turbine 4 is advantageously provided by the alternators 13[a] and/or 13b converted into motor mode (starter function). Regulation of the APU makes it possible to manage this type of cutback of power to be provided by the turbine 4.

Figure 6:
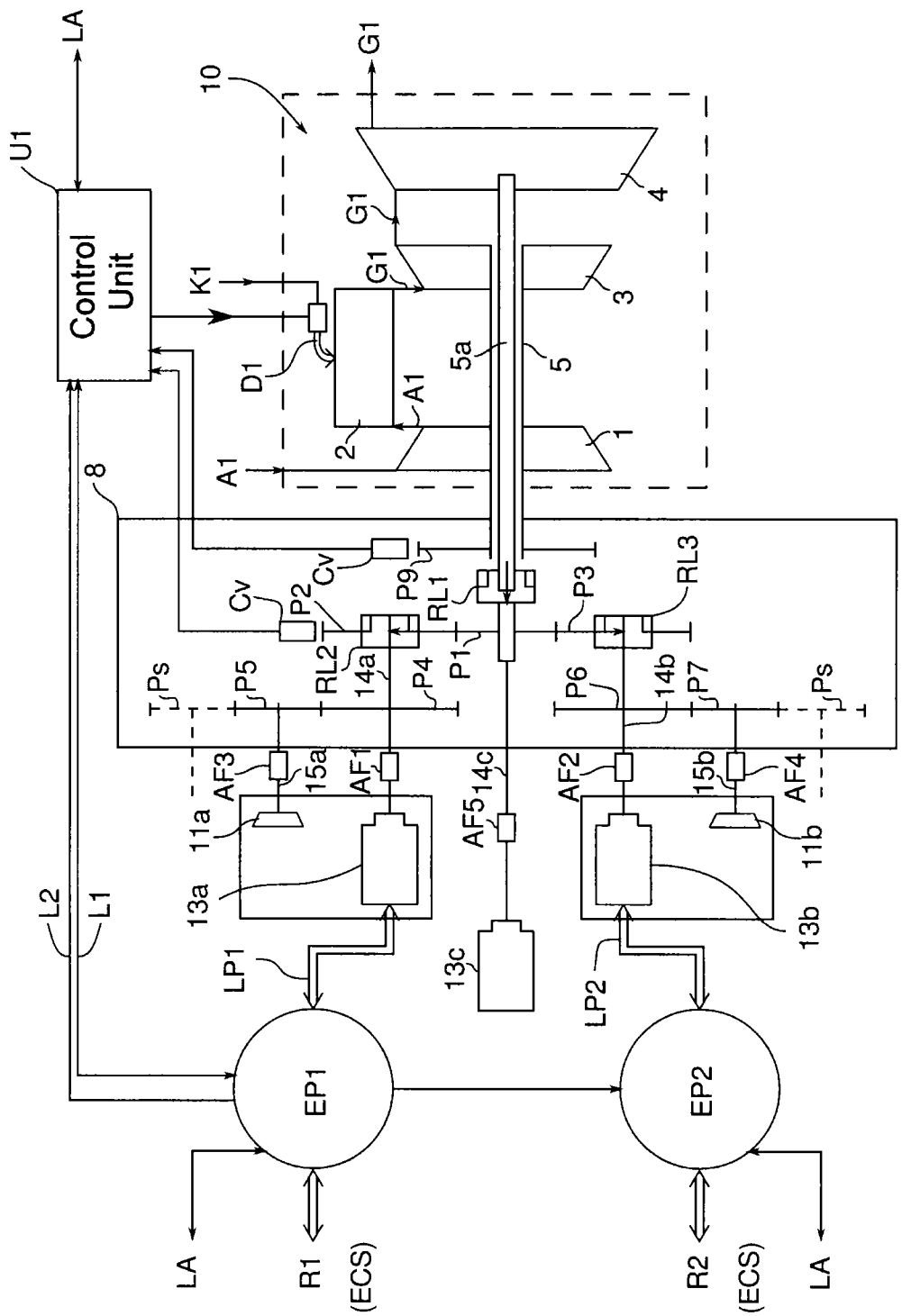
FIG. 6 is a diagram of a variant of FIG. 3 applied to taxiing with a third SG connected directly to the APU.

The diagram shown in FIG. 6 illustrates, as a variant of the architecture for absorbing power during taxiing and/or landing operations, the installation of a convertible alternator or additional SG 13c dedicated to this function. The reduction via a set of pinions on the transmission shaft 14c of the SG 13c, between the SG 13c and the shaft 5a of the APU 10, is not shown in the diagram to avoid overloading the drawing. The mechanical fuse AF5 protects the shafts against the presence of any excess torque.

In the normal traction requirement mode of the landing gear motors, the energy needed to move the aircraft is provided by the SG 13c in generator mode (alternator) driven by the APU 10. This energy is then transmitted to the electric motors of the landing gear wheels.

In braking mode, the electric motors of the wheels are converted into alternators. They then provide electrical energy (transmitted by means of known electric power systems) to the SG 13c converted into motor mode. This energy is transmitted by means of the fuse AF5 to the shaft 5a. The shaft energy supply requirement from the power turbine 4 is reduced accordingly.

Figure 7:
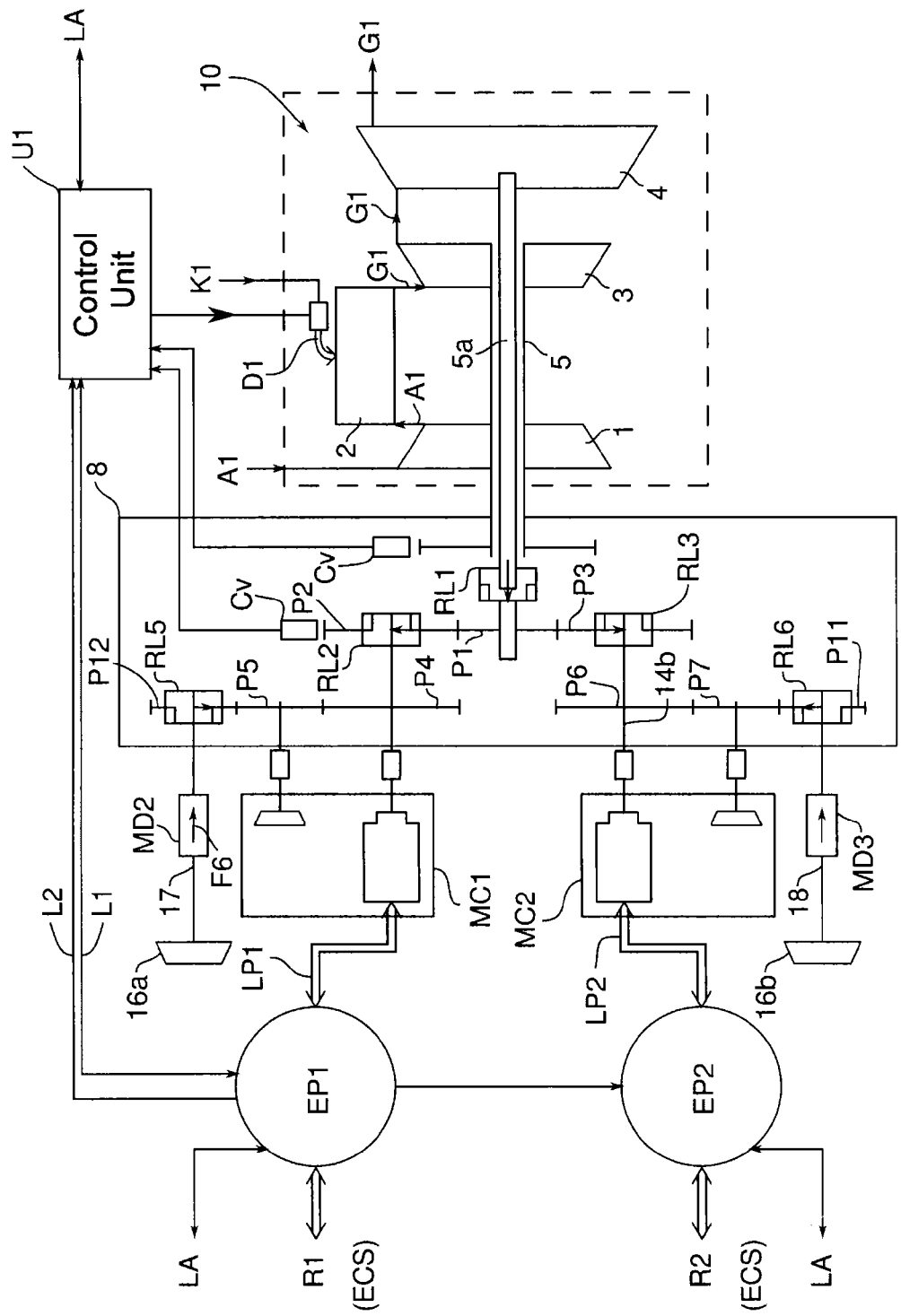
FIG. 7 is a diagram of energy absorption architecture with a recovery turbine.

Another example of power absorption is illustrated by the diagram in FIG. 7. In this example, the configuration shows an APU 10 connected to a recovery turbine 16a. The power recovered is transmitted to a power shaft 17 by means of a release sleeve MD2 in the direction indicated by the arrow F6, in other words, from the turbine 16a towards a pinion gear P12 of the transmission unit 8.

This release sleeve MD2 prevents the turbine 16a from being driven in the event that no power is produced during the different phases of aircraft use (for example, when the doors are open). In addition, a free wheel RL5 transmits power from the turbine shaft 17 to the pinion P12 which engages with the pinions P5 and P4 of the motor-compressor set MC1. The release sleeve MD2 then prevents the turbine 16a from being driven in the event of failure of the transmission free wheel RL5. In addition, in the event of failure of the APU 10, the free wheel RL2 ensures that the power turbine 4 is not driven by the motor-compressor set MC1 or MC2.

If, for safety reasons, a second recovery turbine 16b is required, the two recovery turbines 16a and 16b are linked symmetrically to the two motor-compressor systems MC1/MC2 in the transmission unit 8: shafts 17/18, fuses MD2/MD3, free wheels RL5/RL6, pinions P12-P5-P4/P11-P7-P6.

The invention is not restricted to the examples described and shown. Thus, the arrangement of the transmission unit 8 can be adapted via the number of pinions and the speed reducing ratios.

The transmission unit can be broken down into several parts: a main unit with a series of main drive pinions for each motor-compressor set, and a unit for each motor-compressor set, with or without a recovery turbine. The convertible alternators and the compressors of the motor-compressor sets can be on the same shaft line, or alternatively, if the compressor and the recovery turbine are on two lines, the alternator is integrated with the transmission unit in the form of a removable cartridge.

The position of the free wheels and the fuses can also be adjusted. Appropriate clutches, for example centrifugal or electromechanical clutches, can replace the sleeves or free wheels. Where the power turbine is a fixed type turbine, the two through power 5a and drive shafts 5 are by nature linked.

The architecture may have only one convertible alternator and one load compressor, in other words, a single motor-compressor set.

The system for supplying compressed air on the aircraft may be provided via means other than those described. The main system may be duplicated by an additional motor-compressor system, in order to achieve the safety objectives.

The invention claimed is:

1. A method for rationalising a chain of components for transmission of electrical energy of an aircraft comprising an auxiliary power unit APU, main engines and systems that are end consumers of electrical, pneumatic and/or hydraulic energy, comprising:
   providing, via the APU, mechanical power delivered to a power shaft by connection to at least one energy converter unit via a power transmission unit, each converter unit having only one convertible electromechanical starter/generator SG and an associated energy converter; and
   transmitting electrical power from the converter unit or each converter unit by direct connection, firstly, to the transmission unit and, secondly, to the end consumers.

2. The method for rationalising according to claim 1, in which the connection between the converter unit and the APU is made by connecting the power shaft of the APU to the shaft of the starter/generator SG via a directional transmission of power operating in one direction only running from the drive shaft of the APU to the shaft of the SG, the transmission being free or without communication of drive in the other direction.

3. The method for rationalising according to claim 1, in which the SG or one of the SGs is configured to operate in motor mode during the APU starting phase, and then to drive the APU via a directional transmission of power running from the SG to the APU.

4. The method for rationalising according to claim 3, in which the SG then operating in motor mode is removably connected to the power shaft of the APU in such a away that the associated energy converter is not driven during the APU starting phase.

5. The method for rationalising according to claim 1, in which a turbine for the recovery of energy, by heat exchange at the outlet of hot gases emerging from pneumatic equipment and/or the main engines, drives at least partially a convene unit by connection in the power transmission unit via at least one directional transmission of power running from the recovery turbine to the converter unit.

6. The method for rationalising according to claim 1, in which the SG or one of the converter units is dedicated to taxiing by the supply of electrical energy in combination with a landing gear motor of the aircraft and the other converter unit is dedicated to supplying energy in accordance with the requirements of the aircraft, the unit dedicated to taxiing being configured to operate in generator mode in conjunction with the power shaft of the APU in accordance with the traction requirement of said motor unit, and in motor mode to drive the associated energy converter when the landing gear motor unit is converted to generator mode during the braking phases.

7. The method for rationalising according to claim 1, in which an additional SG is dedicated to taxiing and connected to the shaft of the APU in the transmission unit in order to be driven by this shaft and to operate in generator mode in accordance with the traction requirement of the landing gear motor unit, and to operate in motor mode to drive the shaft of the APU which is itself in motor mode when the landing gear motor unit is converted to generator mode during the braking phases.

8. An electromechanical architecture having components for the transmission of electrical energy in an aircraft, configured to implement the method according to claim 1, comprising:
- an APU;
- a control unit connected to at least one power electronics;
- a unit for transmission of mechanical power by geared means between, firstly, the shafts of at least one converter unit, incorporating for each converter unit a single SG convertible by the control unit and, secondly, a power shaft of the APU transmitting mechanical power; and
- direct electrical power connections to an end consumer system, each converter unit being directly connected mechanically to the power transmission unit and electrically to the end consumers.

9. The electromechanical architecture according to claim 8, in which the transmission of power is performed in the transmission unit by connecting the drive shaft of the APU to the rotating shafts of the starters/generators SG via directional means for the communication of power fitted to the drive shaft of the APU and to the rotating shafts of the SGs.

10. The electromechanical architecture according to claim 9, in which the directional means for the communication of power are chosen from a free wheel, a release sleeve and a centrifugal or electromechanical clutch.

11. The electromechanical architecture according to claim 8, in which the control unit is able, during the APU starting phase, to configure the SG of a converter unit in motor mode and to drive the shaft of the APU by connecting to that shaft via at least one directional means for the communication of power.

12. The electromechanical architecture according to claim 11, in which, during the APU starting phase, the driving of the shaft of the APU is effected by a connection means movable between the SG and the APU shaft via at least one directional transmission means, this connection means being capable of simultaneously effecting a disconnection between the SG and the associated energy converter.

13. The electromechanical architecture according to claim 8, in which an energy recovery turbine, based on heat exchangers at the outlet from pneumatic equipment and/or the main engines, is connected to at least one converter unit in the transmission unit in order to drive it, to complement the driving effected by the APU shaft, via at least one directional transmission means running from the recovery turbine to the converter unit.

14. The electromechanical architecture according to claim 8, in which one of the converter units, dedicated to taxiing by a connection means to at least one drive shaft of the aircraft landing gear motors, another unit being dedicated to supplying energy in accordance with the aircraft requirements, is configured by the control unit in generator mode to complement the driving effected by the shaft of the APU in accordance with the traction requirement of said landing gear motors, and in motor mode to drive the energy converter of this converter unit when the landing gear motors are converted to generator mode by the co unit during braking phases.

15. The electromechanical architecture according to claim 8, in which an additional SG, dedicated to taxiing, is driven by the shaft of the APU by connection in the transmission unit and is converted by the control unit to generator mode to meet the traction requirement of the landing gear motors, and to motor mode to drive the shaft of the APU when the control unit converts the landing gear motors to generator mode during braking phases.

\* \* \* \* \*